US011314800B2

(12) United States Patent
Huang et al.

(10) Patent No.: US 11,314,800 B2
(45) Date of Patent: Apr. 26, 2022

(54) METHOD, APPARATUS, ELECTRONIC DEVICE, AND STORAGE MEDIUM FOR IMAGE-BASED DATA PROCESSING

(71) Applicant: Beijing Baidu Netcom Science and Technology Co., Ltd., Beijing (CN)

(72) Inventors: Pingping Huang, Beijing (CN); Min Qiao, Beijing (CN); Ying Li, Beijing (CN); Jianhui Huang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 229 days.

(21) Appl. No.: 16/690,387

(22) Filed: Nov. 21, 2019

(65) Prior Publication Data
US 2020/0242152 A1    Jul. 30, 2020

(30) Foreign Application Priority Data
Jan. 30, 2019 (CN) .......................... 201910094119.2

(51) Int. Cl.
*G06F 16/00* (2019.01)
*G06F 16/532* (2019.01)
(Continued)

(52) U.S. Cl.
CPC .......... *G06F 16/532* (2019.01); *G06F 16/535* (2019.01); *G06F 16/5854* (2019.01); *G06K 9/623* (2013.01)

(58) Field of Classification Search
CPC .. G06F 16/532; G06F 16/5854; G06F 16/535; G06F 16/3329; G06F 16/53; G06K 9/623
See application file for complete search history.

(56) References Cited

U.S. PATENT DOCUMENTS 6,240,423 B1 *  5/2001  Hirata ................. G06F 16/5854
10,534,810 B1 *  1/2020  Manor ................. G06F 16/288
(Continued)

FOREIGN PATENT DOCUMENTS

CN       107169111 A      9/2017
CN       108228703 A      6/2018
(Continued)

OTHER PUBLICATIONS

Hyeonseob Nam et al.; "Dual Attention Networks for Multimodal Reasoning and Matching"; CVPR Paper, copyright 2017; pp. 299-306 (9 pages).
(Continued)

*Primary Examiner* — Jared M Bibbee
(74) *Attorney, Agent, or Firm* — Nixon Peabody LLP

(57) ABSTRACT

Embodiments of the present disclosure provide a method, apparatus, electronic device, and computer readable storage medium for image-based data processing. The method includes: determining, in response to an inputted query for an image, an attribute associated with an object presented in the image based on a preset mapping between the object and the attribute, further includes: determining a degree of correlation between the object and the query based on the object and the attribute, and still further includes: providing a response to the query based on the degree of correlation between the object and the query. The embodiments of the present disclosure can improve the performance of the system for image-based data processing.

13 Claims, 8 Drawing Sheets

(51) Int. Cl.
*G06F 16/583* (2019.01)
*G06F 16/535* (2019.01)
*G06K 9/62* (2022.01)

(56) References Cited

U.S. PATENT DOCUMENTS

| | | | |
|---|---|---|---|
| 2009/0278858 A1* | 11/2009 | Shigeeda | G06F 16/58 345/629 |
| 2012/0308121 A1* | 12/2012 | Datta | G06K 9/6263 382/155 |
| 2013/0336579 A1* | 12/2013 | Rashad Mohamed | G06K 9/6256 382/159 |
| 2014/0355871 A1* | 12/2014 | Mohamed | G06K 9/6262 382/159 |
| 2016/0342895 A1 | 11/2016 | Gao et al. | |
| 2017/0124432 A1 | 5/2017 | Chen et al. | |
| 2019/0043201 A1* | 2/2019 | Strong | G06K 9/00993 |
| 2020/0104742 A1 | 4/2020 | Huang et al. | |
| 2020/0193228 A1 | 6/2020 | Lu et al. | |

FOREIGN PATENT DOCUMENTS

| | | | |
|---|---|---|---|
| CN | 108446404 A | 8/2018 | |
| CN | 109241267 A | 1/2019 | |
| JP | 2014-041560 A | 3/2014 | |
| JP | 2017091525 A | 5/2017 | |
| JP | 2017220019 A | 12/2017 | |
| JP | 2018165926 A | 10/2018 | |
| WO | WO-2017114237 A1 * | 7/2017 | G06K 9/6202 |

OTHER PUBLICATIONS

Qing Li; "Research on Visual Question Answering Based on Deep Neural Network and Attention Mechanism" University of Science and Technology of China dissertation; in Chinese, with English abstract; Jun. 4, 2018 (69 pages).

Ilievsk, I. et al., "A focused dynamic attention model for visual question answering," University of Singapore pp. 1-16 (2016).

* cited by examiner

METHOD, APPARATUS, ELECTRONIC DEVICE, AND STORAGE MEDIUM FOR IMAGE-BASED DATA PROCESSING

CROSS-REFERENCE TO RELATED APPLICATIONS

This application claims priority to Chinese Patent Application No. 201910094119.2, filed on Jan. 30, 2019, titled "Method, Apparatus, Electronic Device, and Storage Medium for Image-Based Data Processing" which is hereby incorporated by reference in its entirety.

TECHNICAL FIELD

Embodiments of the present disclosure generally relate to the field of information processing technology, and more particularly to, a method, apparatus, electronic device, and computer readable storage medium for image-based data processing.

BACKGROUND

Visual question answering (VQA) is an information processing technology relating to computer vision and natural language processing. A visual question answering system generally takes an image and a free-form and open natural language question related to the image as an input, and takes a natural language answer generated for the question as an output. Such a question may be regarded as a query of a user on the image, and an answer provided by the visual question answer system may be regarded as a response to the query. Thus, the user may input the image into the visual question answering system, and then propose the query related the image to the visual question answering system. After the visual question answer system makes a response, the user may determine whether the response is correct, thereby investigating the comprehension ability of the visual question answering system on the image. More generally, the vision question answering system may be considered as a system for image-based data processing.

However, the response provided by the conventional system for image-based data processing is still less accurate, and fails to meet the user needs in many cases, thereby resulting in poor user experience.

SUMMARY

Embodiments of the present disclosure relate to a method, apparatus, electronic device, and computer readable storage medium for image-based data processing.

In a first aspect, an embodiment of the present disclosure provides a method for image-based data processing. The method includes: determining, in response to an inputted query for an image, an attribute associated with an object presented in the image based on a preset mapping between the object and the attribute. The method further includes: determining a degree of correlation between the object and the query based on the object and the attribute. The method further includes: providing a response to the query based on the degree of correlation.

In a second aspect, an embodiment of the present disclosure provides an apparatus for image-based data processing. The apparatus includes: an attribute determining module configured to determine, in response to an inputted query for an image, an attribute associated with an object presented in the image based on a preset mapping between the object and the attribute. The apparatus further includes: a correlation degree determining module configured to determine a degree of correlation between the object and the query based on the object and the attribute. The apparatus further includes: a response providing module configured to provide a response to the query based on the degree of correlation.

In a third aspect, an embodiment of the present disclosure provides an electronic device. The electronic device includes one or more processors; and a storage unit configured to store one or more programs. The one or more programs, when executed by the one or more processors, cause the one or more processors to implement the method in the first aspect.

In a fourth aspect, an embodiment of the present disclosure provides a computer readable storage medium, storing a computer program thereon, where the computer program, when executed by a processor, implements the method in the first aspect.

It should be understood that content described in the SUMMARY section is neither intended to limit key or important features of the embodiments of the present disclosure, nor intended to limit the scope of the present disclosure. Other features of the present disclosure will become readily understood in conjunction with the following description.

BRIEF DESCRIPTION OF THE DRAWINGS

After reading detailed descriptions below with reference to the following accompanying drawings, the above and other objectives, features and advantages of embodiments of the present disclosure will become readily understood. The accompanying drawings show some embodiments of the present disclosure by examples, rather than non-limiting approaches.

Identical or like reference numerals are used to designate identical or like components throughout the accompanying drawings.

DETAILED DESCRIPTION OF EMBODIMENTS

The principles and spirit of the present disclosure will be described below with reference to some example embodiments shown in the accompanying drawings. It should be understood that these specific embodiments are described merely to enable those skilled in the art to better understand and implement the present disclosure, and are not intended to impose any limitation on the scope of the present disclosure.

As mentioned above, the response provided by the conventional system for image-based data processing is still less accurate, and fails to meet the user needs in many cases, thereby resulting in poor user experience. The inventors found through researches that, a main reason for less accurate response of the conventional system for image-based data processing is that the conventional system for image-based data processing cannot accurately determine an object of interest in an image in a process of answering a query of a user, such that the system for image-based data processing outputs an incorrect response. This is described in detail below by way of examples.

Figure 1A:
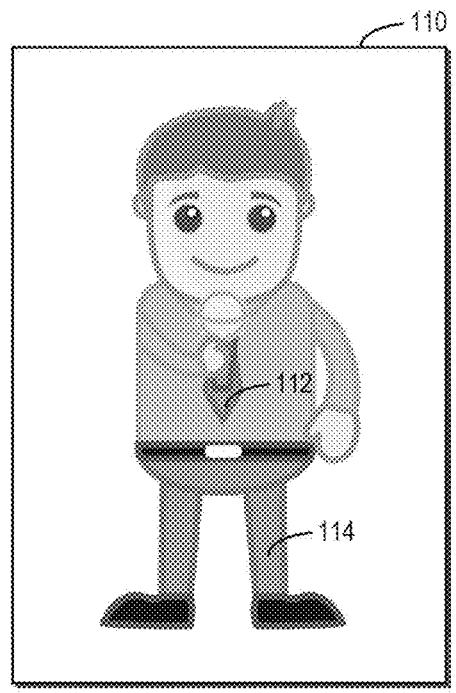
FIG. 1A-FIG. 1C show three example images to be processed by a system for image-based data processing.
Figure 1B:
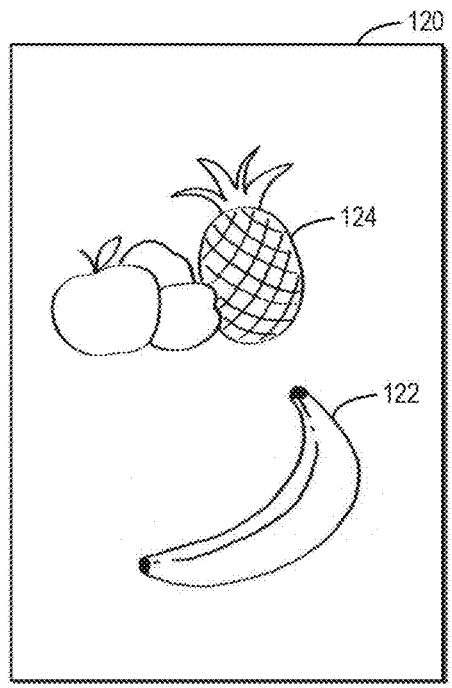
Figure 1C:
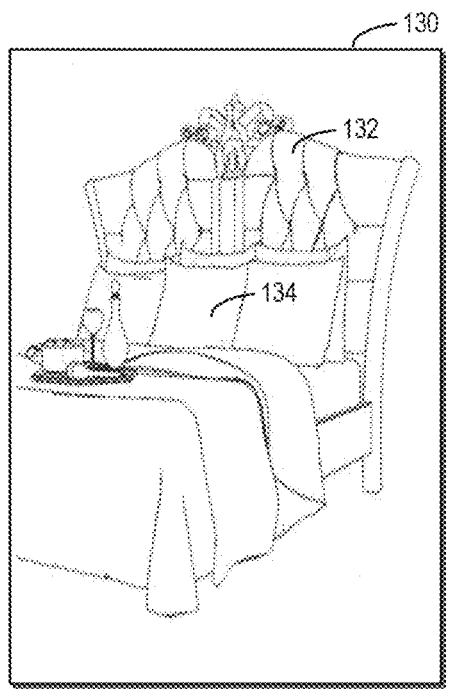

FIG. 1A-FIG. 1C show three example images to be processed by a system for image-based data processing. As shown in FIG. 1A, an image 110 presents a person wearing a tie 112 and trousers 114. For example, a query inputted by a user for the image 110 may be "Does his tie match his trousers?" As shown in FIG. 1B, an image 120 presents some different fruits, including a banana 122, a pineapple 124, and the like. For example, a query inputted by a user for the image 120 may be "What is the yellow fruit?" It should be appreciated that, the image 120 shown here is colorless, but in an actual scenario, the fruit presented in the image 120 may be colorful. As shown in FIG. 1C, an image 130 presents a bed and related items, including a bedhead 132, a pillow 134, and the like. For example, a query inputted by a user for the image 130 may be "Is the bedhead soft?"

It should be appreciated that the images 110-130 presented here and specific queries for the images are merely illustrative, and are not intended to impose any limitation on the scope of the present disclosure. In other embodiments, an image processed by the system for image-based data processing may be any image presenting any object, and a query presented by a user for the image may be any query on the object presented in the image. That is, the embodiment of the present disclosure may be applicable to any image and any query that can be processed by the system for image-based data processing.

For the image 110, the image 120, and the image 130 in FIG. 1A-FIG. 1C, and the above queries presented for the images, some conventional processes of the system for image-based data processing include first extracting features from the images and the queries, then performing multimodal fusion on the features of both, and finally outputting responses to the queries via a classifier. However, the images often contain various complex and redundant objects and scenarios, which bring great challenges to understanding the image by the system for image-based data processing. Thus, the conventional way of extracting global features from the image, and then performing multimodal fusion of the global features and query features has poor effects.

In some other conventional systems for image-based data processing, in order to narrow the search scope of image information to put more computing resources on key objects, the system for image-based data processing may use an attention mechanism. Specifically, with the help of an object detection algorithm, the system for image-based data processing can screen out some significant objects (e.g., first 36 objects with highest confidence scores of the object detection algorithm) in the image, and extract features of these objects to replace global image features to perform multimodal fusion with the query features.

For this conventional system for image-based data processing using the attention mechanism, the inventors perform visual analysis and research on a region of interest of the conventional system for image-based data processing using a common visualization method. With this research, the inventors find that a focus of attention of the conventional system for image-based data processing deviates from the original intention of the query in some cases, such that finally the system for image-based data processing provides an incorrect response. This is described in detail below in conjunction with FIG. 2A-FIG. 2C.

Figure 2A:
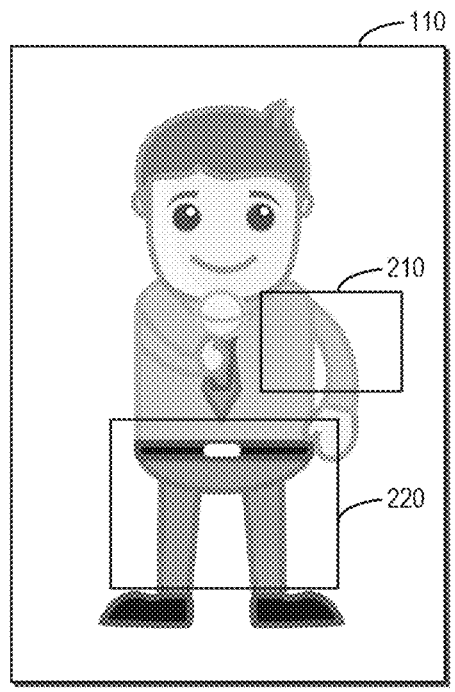
FIG. 2A-FIG. 2C show a schematic diagram of a region of interest of the system for image-based data processing of a conventional scheme using an attention mechanism.
Figure 2B:
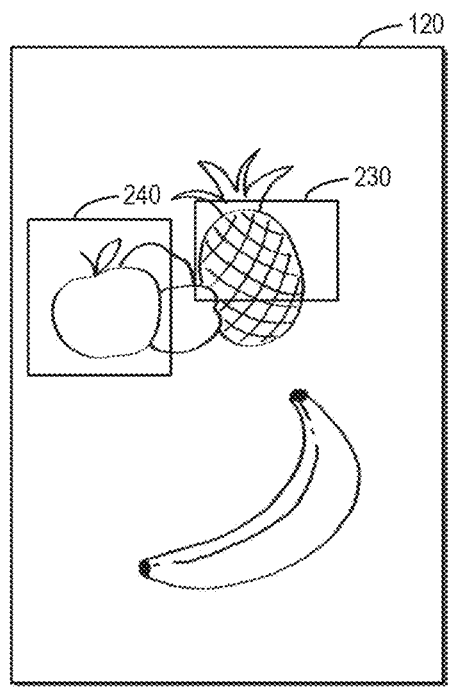
Figure 2C:
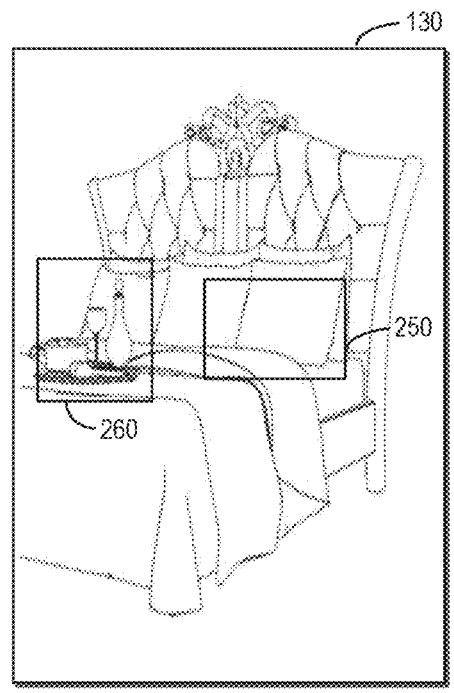

FIG. 2A-FIG. 2C show a schematic diagram of a region of interest of the system for image-based data processing of a conventional scheme using an attention mechanism. As shown in FIG. 2A, regarding the image 110, the system for image-based data processing of the conventional scheme pays more attention to region 210 and region 220, which do not include the tie 112 involved in the query of the user. As shown in FIG. 2B, regarding the image 120, the system for image-based data processing of the conventional scheme pays more attention to region 230 and region 240, which do not include the banana 122 involved in the query of the user. As shown in FIG. 2C, regarding the image 130, the system for image-based data processing of the traditional scheme pays more attention to region 250 and region 260, which do not include the bedhead 132 involved in the query of the user. It will be appreciated that, the specific number, size, and shape of the regions 210-260 here are merely illustrative, are intended to aid the readers in understanding the regions of interest of the system for image-based data processing, and are not intended to impose any limitation on the scope of the present disclosure. In other embodiments, the system for image-based data processing may pay attention to any number, any size, and any shape of regions in the image.

As can be seen from FIG. 2A-FIG. 2C, the query is not related to the region of interest of the conventional system for image-based data processing, such that the system for image-based data processing outputs an incorrect response. The root cause of this situation is that the conventional attention mechanism does not effectively fuse or associate significant object information provided by the object detection algorithm with the query of the user, such that the system for image-based data processing is still not sure which object or objects to focus on. Thus, the conventional method uses the attention mechanism, and introduces most significant object information in the image using the object detection algorithm, but in many cases, the system for image-based data processing still fails to provide a correct response.

In view of the above problems and other potential problems existing in the conventional scheme, embodiments of the present disclosure present a method, apparatus, electronic device, and computer readable storage medium for image-based data processing, to improve the attention mechanism and the focus of attention of the system for image-based data processing, thus improving the accuracy of response provided by the system for image-based data processing.

In some embodiments, the presented system for image-based data processing not only provides feature information of the object using the object detection algorithm, but also determines a degree of correlation between the object and the query. For example, the system for image-based data processing may introduce combinations of these objects and attributes thereof (also referred to as category tags), and convert the category tags into feature representations in the same dimensions as the query features. Then, the system for image-based data processing performs similarity computing on a category tag feature of each object and a query feature, to obtain the degree of correlation between each object and the query.

Further, the system for image-based data processing provides an attention weight of the object based on the degree of correlation between the object and the query. For example, with higher attention weight, the object receives more attention from the system for image-based data processing when the system for image-based data processing determines the response to the query, thereby improving the accuracy of the focus of attention of the system for image-based data processing. Some embodiments of the present disclosure will be described below in conjunction with the accompanying drawings.

Figure 3:
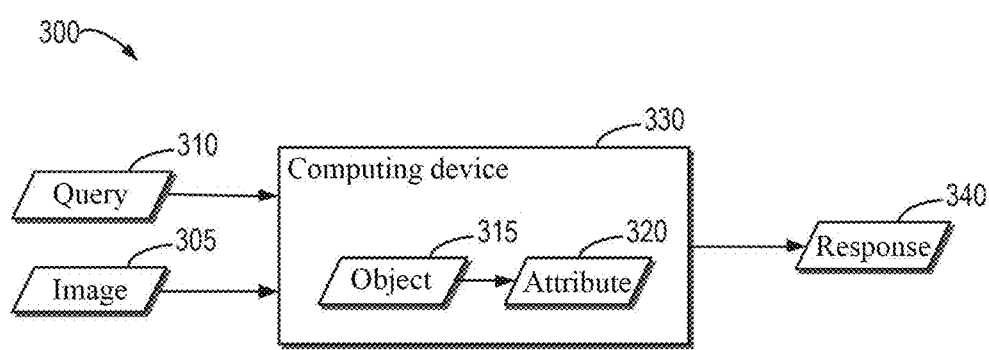
FIG. 3 shows a schematic diagram of an example environment in which some embodiments of the present disclosure can be implemented.

FIG. 3 shows a schematic diagram of an example environment 300 in which some embodiments of the present disclosure may be implemented. As shown in FIG. 3, in the example environment 300, a user (not shown) may input an image 305 and a query 310 related to the image 305 into a computing device 330. The computing device 330 may identify an object 315 from the image 305. As used herein, the object 315 in the image 305 may refer to any object presented in the image 305, for example, an object having a certain shape and size, such as buildings, human bodies, and animals. In other cases, the object 315 may further be a thing without a fixed shape and size, e.g. sky, grass, and cloud. More generally, the object 315 may be any object that can be identified from the image 305 using any existing object identification technology or any object identification technology to be developed in the future.

After identifying the object 315, the computing device 330 may determine an attribute 320 of the object 315. As used herein, the attribute 320 may refer to a property that is generally possessed by the object 315, such as color or state of the object 315. In the case where the object 315 is a person, the state of the object 315 may refer to standing or other states of the person. More generally, the attribute 320 may refer to any property that may be presented by the object 315 in the image 305. Since the property may be presented by the image 305, the query 310 of the user for the object 315 may relate to the property of the object 315.

Further referring to FIG. 3, after determining the attribute 320 of the object 315, the computing device 330 may determine the degree of correlation between the object 315 and the query 310 based on the object 315 and the attribute 320. That is, the computing device 330 determines whether the query 310 is associated with the object 315 and a degree of association between the query and the object. For example, if the query 310 directly mentions the object 315 or the attribute 320, then the query 310 generally has a very high degree of correlation with the object 315. For another example, if the query 310 mentions an object analog or similar to the object 315 or an attribute analog or similar to the attribute 320, then the query 310 is also likely to have a high degree of correlation with the object 315.

After determining the degree of correlation between the object 315 and the query 310, the computing device 330 may provide a response 340 for the query 310 based on the degree of correlation. For example, the computing device 330 may determine a degree of correlation between each of a plurality of objects presented in the image 305 and the query 310, and then pay more attention to an object having a high degree of correlation and less attention to an object having a low degree of correlation in a process of providing the response 340. It will be appreciated that, except for an explicit answer to the query 310, the response 340 here may further include a response to the query 310 in various other forms. For example, the response 340 may be an indication that the computing device 330 fails to provide an explicit answer to the query 310 or any other response information to the user.

It will be appreciated that, the computing device 330 may be any type of mobile terminal, fixed terminal, or portable terminal, including a mobile phone, a station, a unit, a device, a multimedia computer, a multimedia tablet computer, an Internet node, a communicator, a desktop computer, a laptop computer, a notebook computer, a netbook computer, a tablet computer, a personal communication system (PCS) device, a personal navigation device, a personal digital assistant (PDA), an audio/video player, a digital camera/camcorder, a positioning device, a television receiver, a radio broadcast receiver, an electronic book device, a game device, or any combination thereof, including fittings and peripherals of these devices, or any combination thereof. It may be further expected that the computing device 330 can support any type of user-specific interface (such as a "wearable" circuit). An exemplary operation for image-based data processing according to an embodiment of the present disclosure will be described below in conjunction with FIG. 4.

Figure 4:
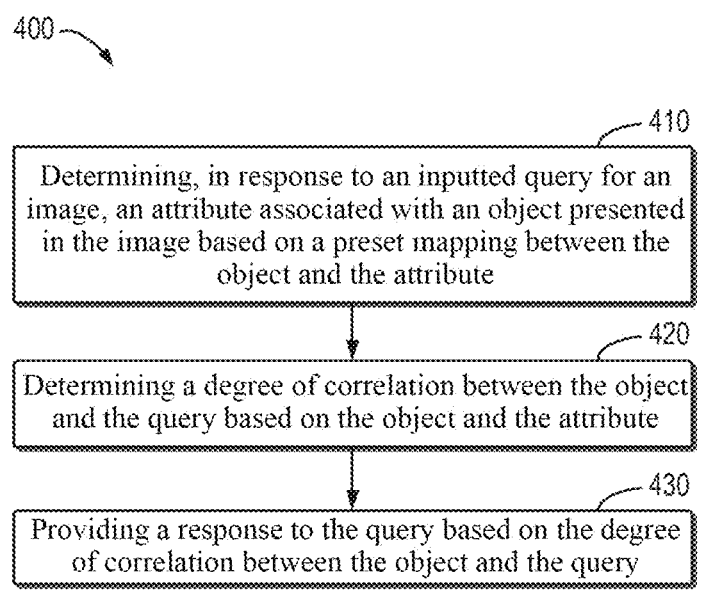
FIG. 4 is a schematic flowchart of a method for image-based data processing according to an embodiment of the present disclosure.

FIG. 4 shows a schematic flowchart of a method 400 for image-based data processing according to an embodiment of the present disclosure. In some embodiments, the method 400 may be implemented by the computing device 330 of FIG. 3, for example, may be implemented by a processor or processing unit of the computing device 330. In other embodiments, all or a portion of the method 400 may be further implemented by a computing device independent of the computing device system 330, or may be implemented by other units in the example environment 300. For the ease of discussion, the method 400 will be described in conjunction with FIG. 3.

In step 410, the computing device 330 determines, in response to the inputted query 310 for the image 305, the attribute 320 associated with the object 315 presented in the image 305 based on a preset mapping between the object and the attribute. In some embodiments, the computing device 330 may detect the object 315 in the image 310 using any existing object detection algorithm or any object detection algorithm to be developed in the future. After detecting the object 315, the computing device 330 may determine whether there is correlation between the object 315 and the query 310, to determine whether the object 315 should be considered and to what extent the object 315 is considered when providing the response 340. When determining the correlation, the computing device 330 utilizes not only the object 315 itself, but also the attribute 320 of the object 315, the reasons of which are explained below.

In some cases, the query 310 may directly mention the object 315, which indicates that the query 310 is associated with the object 315. In some other cases, the query 310 may not directly relates to the object 315, but relates to an attribute of the object 315. For example, in the above query "What is the yellow object?" for the image 120, the query does not directly mention the object (e.g., the banana 122) in the image, but relates to the attribute of the banana 122 (yellow color). That is, in the case where the query 310 relates to the attribute 320 of the object 315, the computing device 330 may further considers that the query 310 is associated with the object 315. Thus, after the user inputs the query 310 for the image 305, the computing device 330 first detects the object 315 and the attribute 320 thereof in the image 305. Specifically, the computing device 330 may determine the attribute 320 based on the preset mapping between the object and the attribute. For example, the preset mapping may be based on priori knowledge, for example, a banana is generally yellow, while an apple is generally red, and so on.

In some embodiments, to determine the attribute 320 of the object 315, the computing device 330 may obtain the attribute 320 from a predefined data set based on the object 315. For example, the data set may include pre-annotated objects and attributes from a plurality of images, such as a visual genome data set, which includes, for example, pre-annotated 1,600 entity name tags and 400 attribute tags from 100,000 images. By this approach, the computing device 330 may make full use of a well-established preset relationship between the object and the attribute presented on a pre-annotated image, thus reducing the computing complexity in determining the attribute of the object based on the object.

In step 420, the computing device 330 determines the degree of correlation between the object 315 and the query 310 based on the object 315 and the attribute 320. As mentioned above, if the query 310 directly relates to the object 315 itself or the attribute 320 thereof, then the query 310 has a very high degree of correlation with the object 315. In a more general case, the computing device 330 may determine a degree of correlation between the description unit in the query 310, and the object 315 and the attribute 320, to determine the correlation between the object 315 and the query 310. For example, the description unit here may refer to words, phrases, sentences, any other suitable description unit, or any combination thereof in the query 310.

When determining correlation between the description unit of the query 310 and the object 315, the computing device 330 may determine a first feature representation of a combination of the object 315 and the attribute 320. For example, the combination of the object 315 and the attribute 320 (which may also be referred to as a category tag of the object 315 herein) may be "a yellow banana," "a black pen," "a standing monkey," and the like. The computing device 330 may convert the category tag of the object 315 into a first feature representation in a particular dimension (e.g., 300-dimension) based on a predefined mapping table between words and features.

Then, the computing device 330 may determine at least one second feature representation corresponding to at least one description unit in the query 310. For example, the computing device 330 may extract a specific number (e.g., 14) of words from the query 310. In the case of this exemplary number, the computing device 330 may convert the 14 words into 14 second feature representations based on the same predefined mapping table between given words the features, which is used in the feature conversion of the category tag of the object 315. It should be understood that various specific numbers, specific objects and specific attributes used herein are merely exemplary, and are not intended to impose any limitation on the scope of the present disclosure. In other embodiments, the object 315 and the attribute 320 may be any suitable object and an attribute associated with the suitable object, and the computing device 330 may determine any suitable number of description units from the query 310.

Then, the computing device 330 may obtain the degree of correlation between the object 315 and the query 310 based on the first feature representation of the category tag of the object 315 and the at least one second feature representation of the query 310. In the case where there is merely one second feature representation, the computing device 330 may directly compute a similarity (e.g., a cosine similarity) between the first feature representation and the second feature representation, to determine the degree of correlation between the object 315 and the query 310. By this approach, the computing device 330 may quantify the degree of correlation between the object 315 and the query 310 by numerical computation.

In the case where there is a plurality of second feature representations, the computing device 330 may compute a plurality of similarities between the first feature representation and the plurality of second feature representations respectively. Then, the computing device 330 may obtain the degree of correlation between the object 315 and the query 310 based on the plurality of similarities obtained from the computing. By this approach, the computing device 330 may comprehensively consider likeness between a feature representation of the object 315 and feature representations of a plurality of description units of the query 310, thus more accurately determining the degree of correlation between the object 315 and the query 310. For example, the computing device 330 may select a maximum value, a median, an average value, a weighted value, any other suitable computing value, or any combination thereof of the plurality of similarities for use as the degree of correlation between the object 315 and the query 310. Thus, the computing device 330 may process the obtained similarities using different computing approaches, thus adjusting the accuracy and rationally of the finally obtained degree of correlation.

In step 430, the computing device 330 provides the response 340 to the query based on the degree of correlation between the object 315 and the query 310. For example, if the computing device 330 determines that the object 315 has a high degree of correlation with the query 310, then compared with other objects having a low degree of correlation with the query 310 in the image 305, the computing device 330 should take the object 315 into more consideration when determining the response 340. Otherwise, if the computing device 330 determines that the object 315 has a low degree of correlation with the query 310, then compared with other objects having a high degree of correlation with the query 310 in the image 305, the computing device 330 should take the object 315 into less consideration when determining the response 340.

In some embodiments, to quantify an extent of consideration of the object 315 by the computing device 330 in determining the response 340, the computing device 330 may determine a weight of the object 315 based on the degree of correlation between the object 315 and the query 310. The weight may indicate an importance degree of the object 315 when the computing device 330 determines the response 340. After determining the weight, the computing device 330 may determine content of the response 340 based on the weight. By this approach, the computing device 330 may provide different weights for a plurality of different objects in the image 305, thereby improving the focus of attention when the computing device 330 determines the response 340, and finally improving the accuracy of the response 340.

Figure 5A:
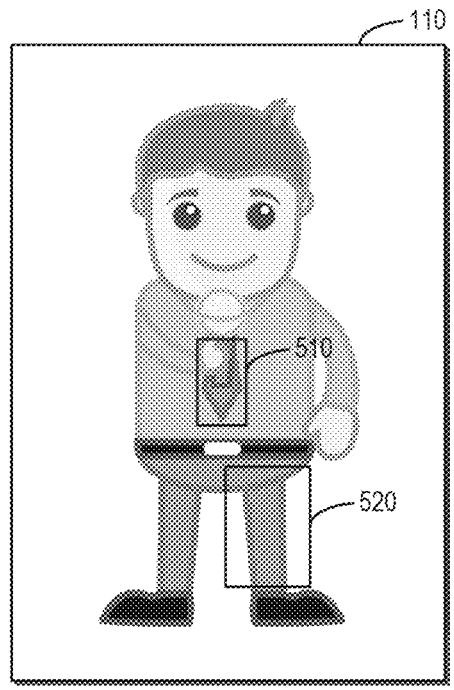
FIG. 5A-FIG. 5C show a schematic diagram of a region of interest of the system for image-based data processing according to an embodiment of the present disclosure.
Figure 5B:
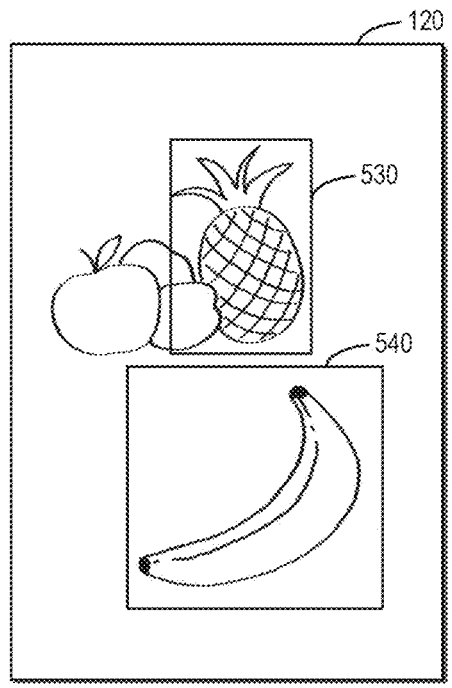
Figure 5C:
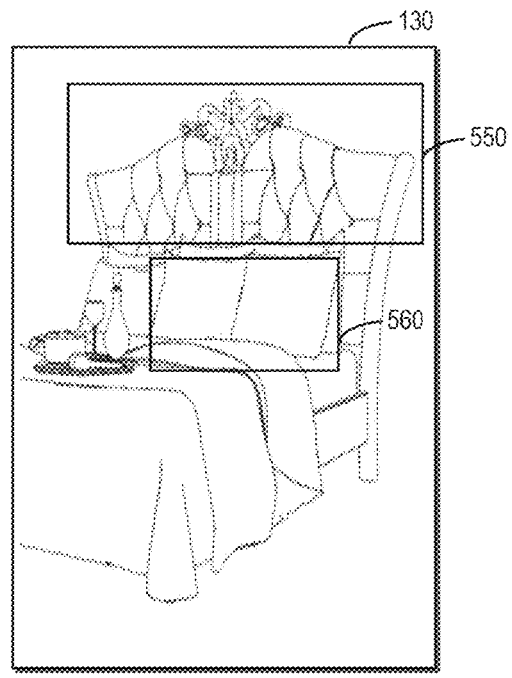

FIG. 5A-FIG. 5C show a schematic diagram of a region of interest of the system for image-based data processing according to an embodiment of the present disclosure. As shown in FIG. 5A, regarding the image 110, the system for image-based data processing according to an embodiment of the present disclosure may pay attention to region 510 and region 520. The region 510 includes the tie 112 involved in the query. As shown in FIG. 5B, regarding the image 120, the system for image-based data processing according to an embodiment of the present disclosure may pay attention to region 530 and region 540. The region 540 includes the banana 122 involved in the query. As shown in FIG. 5C, regarding the image 130, the system for image-based data processing according to an embodiment of the present disclosure may pay attention to region 550 and region 560. The region 550 includes the bedhead 132 involved in the query. It will be appreciated that, the specific number, size, and shape of the regions 510-560 here are merely illustrative, are intended to aid the readers in understanding the regions of interest of the system for image-based data processing, and are not intended to impose any limitation on the scope of the present disclosure. In other embodiments, the system for image-based data processing may pay attention to any number, any size, and any shape of regions in the image.

As can be seen from FIG. 5A-FIG. 5C, the system for image-based data processing according to an embodiment of the present disclosure effectively corrects an incorrect focus of attention, and provides a correct response. Thus it can be seen that, the embodiment of the present disclosure introduces a category tag of the object in the image, and establishes a more direct relation between the image and the query, to contribute to more accurately finding out a region that should receive the most attention in the image, thus reducing or eliminating the problem of deviation from the focus of attention with respect to the conventional system for image-based data processing. For example, the embodiment of the present disclosure consolidates a correlation relationship between the query and the image, and helps the system for image-based data processing to correctly find out the region of interest, thus effectively improving the performance of the system for image-based data processing.

Figure 6:
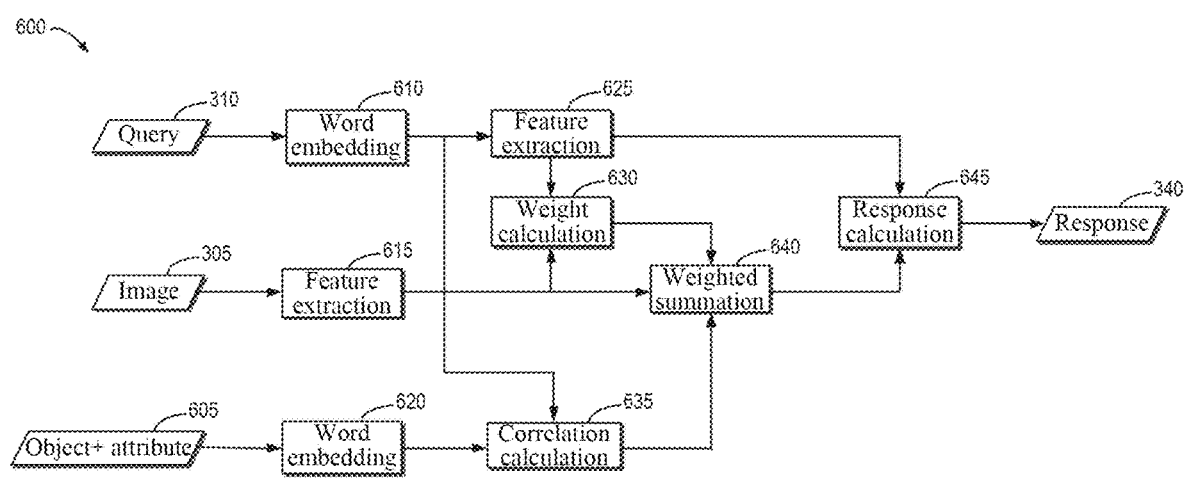
FIG. 6 shows a structural block diagram of an example system for image-based data processing according to an embodiment of the present disclosure.

FIG. 6 shows a structural block diagram of an example system 600 for image-based data processing according to an embodiment of the present disclosure. It will be understood that, the example system 600 for image-based data processing may be an example structure implementing embodiments of the present disclosure, and is not intended to impose any limitation on the scope of the present disclosure. In other embodiments, the embodiment of the present disclosure may be implemented in the computing device 330 or any other device with a computing power using any suitable system architecture.

As shown in FIG. 6, the system 600 may be considered to have three inputs. Specifically, a first input inputs a text of the query 310 into a word embedding module 610 for conversion into a word vector. For example, the word embedding module 610 may convert each word in the query 310 into a feature representation in a specific dimension (e.g., 300-dimension) based on a "word-feature" mapping table. Then, a feature extracting module 625 may extract features of the query 310 based on a word vector representation of the query 310. In some embodiments, the feature extracting module 625 may be implemented based on a gated recurrent unit (GRU).

A second input first extracts a most significant number k (k is a natural number) of objects in the inputted image 305 using an object detection algorithm. The feature extracting module 625 may represent each significant object with a feature of a convolutional neural network (CNN) in a preset dimension (e.g., 2048-dimension). A weight computing module 630 may perform multimodal fusion of query features, e.g., in 14×300 dimension with image features, e.g., in k×2048 (k is generally 36) dimension, to obtain attention weights of the k objects. It should be noted that, the weight computing module 630 computes a weight of the object based on feature representations of the image 305 and the query 310 without considering a degree of correlation between the object and the query 310. Then, a weighted summing module 640 may sum the attention weights computed by the weight computing module 630 and an attention weight of object that is derived from a third input to be described below, and is determined based on correlation between the object and the query 310.

The third input is a category tag 605 of an object presented in the image. The category tag of each object may be a combination of "attribute+entity name." As mentioned above, these category tags may be derived from a visual genome data set. Specifically, after category tags (which may be consistent with a feature sequence of objects in the image of the second input) of the k objects are inputted, the word embedding module 620 may convert the category tag of each object into a feature representation in a preset dimension (e.g., 300-dimension) based on the "word-feature" mapping table. A correlation computing module 635 may compute cosine similarities between a preset number of (e.g., 14) word features of the query 310 and category tag features of k objects of the image respectively using the following equation:

$$\text{similarity} = \cos(\theta) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}} \quad (1)$$

where A and B may represent a category tag feature of an object and a word feature of the query 310, respectively. The similarity in the above equation (1) represents the computed cosine similarity. By the equation (1), a cosine similarity matrix in k×14 dimension may be obtained. Then, a maximum value (i.e., for each object category tag, a maximum value is selected from a preset number of cosine similarities corresponding to the category tag) may be selected from each line in the cosine similarity matrix, for use as an attention weight of the category tag (i.e., object). Finally, the attention weight in k×1 dimension may be obtained.

Further, the weighted summing module 640 may sum the attention weights of the k objects obtained from the third input and the attention weights of the objects computed by the weight computing module 630, and then provide the attention weight sum to a response computing module 645. The response computing module 645 may output a final response 340 based on attention weights of a plurality of objects. For example, the response computing module 645 may compute scores of a plurality of candidate query responses, and use a candidate response with a highest score as content of the final response.

Figure 7:
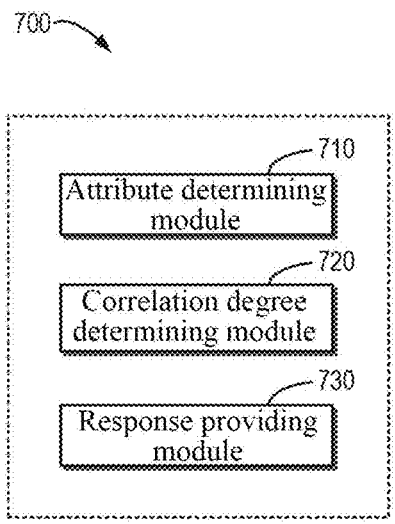
FIG. 7 shows a schematic block diagram of an apparatus for image-based data processing according to an embodiment of the present disclosure.

FIG. 7 shows a schematic block diagram of an apparatus 700 for image-based data processing according to an embodiment of the present disclosure. In some embodiments, the apparatus 700 may be included in the computing device 330 of FIG. 3 or be implemented as the computing device 330.

As shown in FIG. 7, the apparatus 700 includes an attribute determining module 710, a correlation degree determining module 720, and a response providing module 730. The attribute determining module 710 is configured to determine, in response to an inputted query for an image, an attribute associated with an object presented in the image based on a preset mapping between the object and the attribute. The correlation degree determining module 720 is configured to determine a degree of correlation between the object and the query based on the object and the attribute. The response providing module 730 is configured to provide a response to the query based on the degree of correlation.

In some embodiments, the attribute determining module 710 includes: an attribute obtaining module configured to obtain the attribute from a predefined data set based on the object, the data set including pre-annotated objects and attributes from a plurality of images.

In some embodiments, the correlation degree determining module 720 includes: a first feature representation determining module configured to determine a first feature representation of a combination of the object and the attribute; a second feature representation determining module configured to determine at least one second feature representation corresponding to at least one description unit in the query; and a correlation degree obtaining module configured to obtain the degree of correlation based on the first feature representation and the at least one second feature representation.

In some embodiments, the at least one second feature representation includes a plurality of second feature representations, and the correlation degree obtaining module includes: a similarity computing module configured to compute a plurality of similarities between the first feature representation and the plurality of second feature representations respectively; and a correlation degree obtaining module configured to obtain the degree of correlation based on the plurality of similarities.

In some embodiments, the correlation degree obtaining module includes: a selecting module configured to select at least one of a maximum value, a median, an average value, or a weighted value of the plurality of similarities for use as the degree of correlation.

In some embodiments, the response providing module 730 includes: a weight determining module configured to determine a weight of the object based on the degree of correlation, the weight indicating an importance degree of the object in determining the response; and a response determining module configured to determine content of the response based on the weight of the object.

Figure 8:
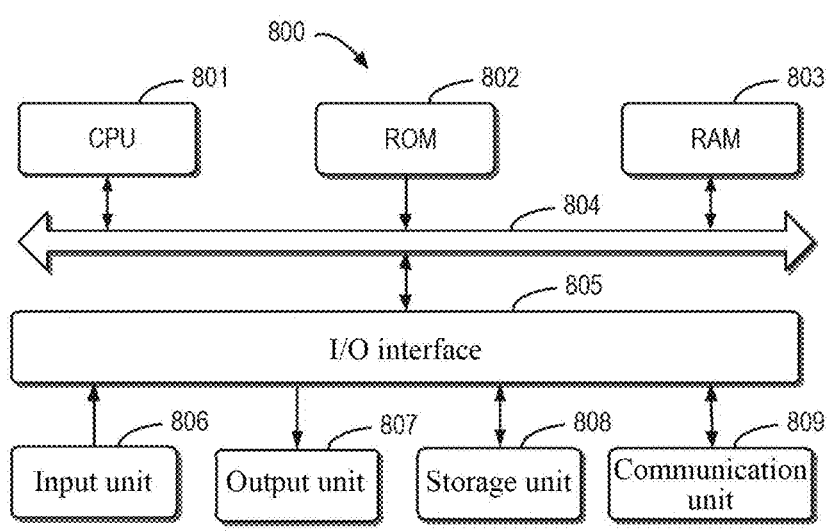
FIG. 8 shows a schematic block diagram of a device that may be used to implement embodiments of the present disclosure.

FIG. 8 shows a schematic block diagram of a device 800 that may be used to implement embodiments of the present disclosure. As shown in FIG. 8, the device 800 includes a central processing unit (CPU) 801, which may execute various appropriate actions and processes in accordance with computer program instructions stored in a read-only memory (ROM) 802 or computer program instructions loaded into a random access memory (RAM) 803 from a storage unit 808. The RAM 803 may further store various programs and data required by operations of the device 800. The CPU 801, the ROM 802, and the RAM 803 are connected to each other through a bus 804. An input/output (I/O) interface 805 is also connected to the bus 804.

A plurality of components in the device 800 is connected to the I/O interface 805, including: an input unit 806, such as a keyboard, and a mouse; an output unit 807, such as various types of displays and speakers; a storage unit 808, such as a magnetic disk, and an optical disk; and a communication unit 809, such as a network card, a modem, and a wireless communication transceiver. The communication unit 809 allows the device 800 to exchange information/data with other devices via a computer network, e.g., the Internet, and/or various telecommunication networks.

The processes described above, such as the method 400, may be executed by the processing unit 801. For example, in some embodiments, the method 400 may be implemented in a computer software program that is tangibly included in a machine readable medium, such as the storage unit 808. In some embodiments, a part or all of the computer program may be loaded and/or installed onto the device 800 via the ROM 802 and/or the communication unit 809. When the computer program is loaded into the RAM 803 and executed by the CPU 801, one or more steps of the method 400 described above may be executed.

As used herein, the term "including" and similar wordings thereof should be construed as open-ended inclusion, i.e., "including but not limited to." The term "based on" should be construed as "at least partially based on." The term "an embodiment" or "the embodiment" should be construed as "at least one embodiment." The terms, such as "first," and "second," may refer to different or identical objects. Other explicit and implicit definitions may be further included herein.

As used herein, the term "determining" covers various actions. For example, the "determining" may include operating, computing, processing, outputting, investigating, searching (e.g., searching in a table, a database or another data structure), ascertaining, and the like. Further, the "determining" may include receiving (e.g., receiving information), accessing (e.g., accessing data in a memory), and the like. Still further, the "determining" may include analyzing, selecting, choosing, establishing, and the like.

It should be noted that the embodiments of the present disclosure may be implemented by hardware, software, or a combination of software and hardware. The hardware portion may be implemented using a dedicated logic. The software portion may be stored in a memory, and is executed by a suitable instruction execution system, such as a microprocessor or dedicated designed hardware. Those skilled in the art may understand that the above device and method may be implemented using a computer executable instruction and/or a computer executable instruction contained in a processor control code. For example, such a code is provided in a programmable memory or a data carrier such as an optical or electronic signal carrier.

Further, while the operations of the method in the embodiments of the present disclosure are described in a particular sequence in the accompanying drawings, this does not require or implies that these operations must be executed in the particular sequence, or all shown operations must be executed to achieve the desired result. On the contrary, the execution sequence of the steps described in the flow charts may be changed. Additionally or alternatively, some steps may be omitted, a plurality of steps may be combined into one step for execution, and/or one step may be decomposed into a plurality of steps for execution. It should be further noted that, the features and functions of two or more apparatuses according to the embodiments of the present disclosure may be embodied in one apparatus. Conversely, the features and functions of one apparatus described above may be further divided into a plurality of apparatuses for embodiment.

Although the present disclosure is described with reference to some specific embodiments, it should be understood that the present disclosure is not limited to the disclosed specific embodiments. The present disclosure is intended to cover various modifications and equivalent arrangements included in the spirit and scope of the appended claims.

What is claimed is:

1. A method for image-based data processing, the method comprising:
    inputting a given image and a query, the given image comprising a plurality of objects comprising a first object and a second object determining attributes associated with the objects presented in the given image from a predefined data set, the data set comprising pre-annotated objects and attributes of the pre-annotated objects, wherein determining the attributes associated with the objects presented in the image comprises: determining the first object and the second object presented in the given image by recognizing the given image, and determining a first attribute of the first object and the second attribute of the second object;
    determining degrees of correlation between the objects and the query based on the objects and the attribute, wherein determining the degrees of correlation between the objects and the queries comprises: determining a first degree of correlation between the first object and the query by comparing the first object and the first attribute with the query, and determining a second degree of correlation between the second object and the query by comparing the second object and the second attribute with the query;
    ranking the first object and the second object by comparing the first degree and the second degree; and
    searching for and providing a response to the query based on the degrees of correlation, wherein the response has a higher relevance to a higher ranked object in the first object and the second object, wherein the method is performed by a processor.

2. The method according to claim 1, wherein the determining the degrees of correlation between the objects and the query comprises:
    determining a first feature representation of a combination of the object and the attribute;
    determining at least one second feature representation corresponding to at least one description unit in the query; and
    obtaining the degree of correlation based on the first feature representation and the at least one second feature representation.

3. The method according to claim 2, wherein the at least one second feature representation comprises a plurality of second feature representations, and the obtaining the degree of correlation comprises:
    computing a plurality of similarities between the first feature representation and the plurality of second feature representations respectively; and
    obtaining the degree of correlation based on the plurality of similarities.

4. The method according to claim 3, wherein the obtaining the degree of correlation comprises:
    selecting at least one of a maximum value, a median, an average value, or a weighted value of the plurality of similarities for use as the degree of correlation.

5. The method according to claim 1, wherein the providing a response to the query comprises:
    determining a first weight of the first object and a second weight of the second object based on the first degree and the second degree; and
    determining the response based on the first weight of the first object and the second weight of the second object.

6. An apparatus for image-based data processing, comprising:
    at least one processor; and
    a memory storing instructions, wherein the instructions when executed by the at least one processor, cause the at least one processor to perform operations, the operations comprising:
    inputting a given image and a query, the given image comprising a plurality of objects comprising a first object and a second object
    determining attributes associated with the objects presented in the given image from a predefined data set, the data set comprising pre-annotated objects and attributes of the pre-annotated object, wherein determining the attributes associated with the objects presented in the image comprises: determining the first object and the second object presented in the given image by recognizing the given image, and determining a first attribute of the first object and the second attribute of the second object;
    determining degrees of correlation between the objects and the query based on the objects and the attribute, wherein determining the degrees of correlation between the objects and the queries comprises: determining a first degree of correlation between the first object and the query by comparing the first object and the first attribute with the query, and determining a second degree of correlation between the second object and the query by comparing the second object and the second attribute with the query;
    ranking the first object and the second object by comparing the first degree and the second degree; and
    searching for and providing a response to the query based on the degrees of correlation, wherein the response has a higher relevance to a higher ranked object in the first object and the second object.

7. The apparatus according to claim 6, wherein the determining the degrees of correlation between the objects and the query comprises:
    determining a first feature representation of a combination of the object and the attribute;
    determining at least one second feature representation corresponding to at least one description unit in the query; and
    obtaining the degree of correlation based on the first feature representation and the at least one second feature representation.

8. The apparatus according to claim 7, wherein the at least one second feature representation comprises a plurality of second feature representations, and the correlation degree obtaining module comprises:
    computing a plurality of similarities between the first feature representation and the plurality of second feature representations respectively; and
    obtaining the degree of correlation based on the plurality of similarities.

9. The apparatus according to claim 8, wherein the obtaining the degree of correlation comprises:
    selecting at least one of a maximum value, a median, an average value, or a weighted value of the plurality of similarities for use as the degree of correlation.

10. The apparatus according to claim 6, wherein the providing a response to the query comprises:
    determining a first weight of the first object and a second weight of the second object based on the first degree and the second degree; and
    determining the response based on the first weight of the first object and the second weight of the second object.

11. A non-transitory computer readable storage medium, storing a computer program thereon, wherein the program, when executed by a processor, causes the processor to perform operations, the operations comprising:
- inputting a given image and a query, the given image comprising a plurality of objects comprising a first object and a second object;
- determining attributes associated with the objects presented in the given image from a predefined data set, the data set comprising pre-annotated objects and attributes of the pre-annotated object, wherein determining the attributes associated with the objects presented in the image comprises: determining the first object and the second object presented in the given image by recognizing the given image, and determining a first attribute of the first object and the second attribute of the second object;
- determining degrees of correlation between the objects and the query based on the objects and the attribute, wherein determining the degrees of correlation between the objects and the queries comprises: determining a first degree of correlation between the first object and the query by comparing the first object and the first attribute with the query, and determining a second degree of correlation between the second object and the query by comparing the second object and the second attribute with the query;
- ranking the first object and the second object by comparing the first degree and the second degree; and
- searching for and providing a response to the query based on the degree of correlation, wherein the response has a higher relevance to a higher ranked object in the first object and the second object.

12. The method according to claim 1, wherein the response is an answer using a natural language.

13. The method according to claim 1, wherein the method is applied to a visual question answering system, the given image and the query are inputs of the system, and the response is an output of the system responding to the inputs and is an answer using a natural language.

* * * * *

UNITED STATES PATENT AND TRADEMARK OFFICE
CERTIFICATE OF CORRECTION

| | |
|---|---|
| PATENT NO. | : 11,314,800 B2 |
| APPLICATION NO. | : 16/690387 |
| DATED | : April 26, 2022 |
| INVENTOR(S) | : Huang et al. |

It is certified that error appears in the above-identified patent and that said Letters Patent is hereby corrected as shown below:

In the Claims

Column 13, Line 6 (Claim 1, Line 5), please insert --;-- following the first recitation of "a second object" therefor.

Column 14, Line 10 (Claim 6, Line 10), please insert --;-- following the first recitation of "a second object" therefor.

Signed and Sealed this
Sixth Day of September, 2022

Katherine Kelly Vidal
*Director of the United States Patent and Trademark Office*